US007195224B2

(12) United States Patent
Le

(10) Patent No.: US 7,195,224 B2
(45) Date of Patent: Mar. 27, 2007

(54) BLOWOUT PREVENTER AND LOCKING MECHANISM

(75) Inventor: Tri Canh Le, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 193 days.

(21) Appl. No.: 11/048,096

(22) Filed: Feb. 1, 2005

(65) Prior Publication Data

US 2006/0169933 A1 Aug. 3, 2006

(51) Int. Cl.
*E21B 33/06* (2006.01)
*F16K 51/00* (2006.01)

(52) U.S. Cl. ........................................ 251/1.3; 251/284

(58) Field of Classification Search ................. 251/1.1, 251/1.2, 1.3, 94
See application file for complete search history.

(56) References Cited

U.S. PATENT DOCUMENTS

| | | | | |
|---|---|---|---|---|
| 3,242,826 | A | 3/1966 | Smith | 92/24 |
| 3,791,616 | A | 2/1974 | LeRouax | 251/1 |
| 3,871,613 | A | 3/1975 | LeRouax | 251/1 |
| 3,918,478 | A | 11/1975 | LeRouax | 137/315 |
| 3,941,141 | A | 3/1976 | Robert | 137/1 |
| 4,052,995 | A | 10/1977 | Ellison | 137/1 |
| 4,076,208 | A | 2/1978 | Olson | 251/1 A |
| 4,188,860 | A | 2/1980 | Miller | 92/15 |
| 4,290,577 | A | 9/1981 | Olson | 251/1 A |
| 4,305,565 | A | 12/1981 | Abbe | 251/1 A |
| 4,519,577 | A | 5/1985 | Jones | 251/62 |
| 4,582,293 | A | 4/1986 | Jones | 251/1.3 |
| 4,601,232 | A | 7/1986 | Troxell, Jr. | 92/24 |
| 4,877,217 | A | 10/1989 | Peil et al. | 251/1.3 |
| 4,969,390 | A | 11/1990 | Williams, II | 92/28 |
| 4,969,627 | A | 11/1990 | Williams, II | 251/1.3 |
| 5,025,708 | A | 6/1991 | Smith et al. | 92/19 |
| 5,056,418 | A | 10/1991 | Granger et al. | 92/24 |
| 5,199,683 | A | 4/1993 | Le | 251/1.3 |
| 5,505,426 | A | 4/1996 | Whitby et al. | 251/1.3 |
| 5,515,916 | A | 5/1996 | Haley | 166/55 |
| 5,575,452 | A | 11/1996 | Whitby et al. | 251/1.3 |
| 5,653,418 | A | 8/1997 | Olson | 251/1.3 |
| 5,735,502 | A | 4/1998 | Levett et al. | 251/1.3 |
| 5,918,851 | A | 7/1999 | Whitby | 251/1.3 |
| 6,857,634 | B2 | 2/2005 | Araujo | 277/325 |

OTHER PUBLICATIONS

Land and Marine Drilling. U Blowout Preventer Wedgelocks. Cameron Iron Works. 1 p. & Cover Page. May 1982.
Ultralock II Automatic Locking System. Shaffer A Varco Company, 2 pp., 2002.

*Primary Examiner*—Eric Keasel
*Assistant Examiner*—Andrew J. Rost
(74) *Attorney, Agent, or Firm*—Guy McClung

(57) ABSTRACT

A blowout preventer having a main body, a ram system with ram apparatus, a movement system with movable shaft apparatus connected to the ram apparatus, the ram apparatus movable from a first open-ram position to a second closed-ram position, the movable shaft apparatus including a locking shaft portion having a tapered portion, a locking system for selectively locking the ram apparatus in the closed position and having locking member apparatus having a primary tapered surface in contact with the locking shaft portion which is movable with the so that the primary tapered surface contacts the tapered portion of the locking shaft portion to releasably lock the movable shaft apparatus.

19 Claims, 7 Drawing Sheets

BLOWOUT PREVENTER AND LOCKING MECHANISM

BACKGROUND OF THE INVENTION

1. Field of the Invention

This present invention is directed to blowout preventers, to locking mechanisms for them, and methods of their use.

2. Description of Related Art

The prior art discloses a wide variety of blowout preventers and locking mechanisms for blowout preventers.

Typical blowout preventers have selectively actuatable rams with movement systems for selectively moving the rams from open to closed positions. The prior art discloses a wide variety of locking mechanisms for locking the rams in a closed position. Rams include pipe rams (to contact, engage, and encompass pipe and/or tools to seal a wellbore), shear rams (to contact and physically shear a pipe or tool in a wellbore) which are usually positioned opposite each other on either side of a main body; and variable bore rams (to contact, encompass, and engage tubulars or pipe of multiple sizes and/or tools or apparatuses to seal a wellbore).

Blowout preventers are disclosed in many U.S. patents, including, but not limited to, U.S. Pat. Nos. 3,946,806; 4,043,389; 4,313,496; 4,132,267, 4,558,842; 4,969,390; 4,492,359; 4,504,037; 2,752,119; 3,272,222; 3,744,749; 4,253,638; 4,523,639; 5,025,708; 5,056,418; 5,400,857; 5,575,452; 5,655,745; and 5,918,851 and in the prior art references cited in these patents.

There has long been a need, recognized by the present inventor for a blowout preventer with an effective and adjustable shaft locking apparatus; and in certain aspects, such an apparatus which is automatic.

SUMMARY OF THE PRESENT INVENTION

The present invention discloses, in certain aspects, a blowout preventer with a main housing, a ram system with ram apparatus (e.g. with selectively movable shear rams, variable bore rams, or pipe rams) movably disposed within the main housing, a movement system with movable shaft apparatus connected to the ram apparatus for moving the ram apparatus from a first position in which the ram apparatus is open to a second position in which the ram apparatus is closed, the movable shaft apparatus including a locking shaft portion, the locking shaft portion having a tapered portion, a locking system for selectively locking the ram apparatus in the closed position, the locking system having locking member apparatus having a primary tapered surface, the primary tapered surface in contact with the locking shaft portion of the movable shaft apparatus, the locking shaft portion movable with the movable shaft apparatus so that the primary tapered surface of the locking member apparatus contacts the tapered portion of the locking shaft portion to releasably lock the movable shaft apparatus. According to the present invention, such blowout preventers may have unlocking apparatus for selectively unlocking a ram apparatus from a closed and/or locked position.

In certain aspects, in such a blowout preventer the tapered portion of the locking shaft portion is of sufficient length that the blowout preventer can accommodate tubulars in a range of different sizes; and, in one particular aspect, the tubular is drill pipe and the blowout preventer can accommodate drill pipe between 2⅞ inches and 7⅝ inches in diameter.

In certain aspects, in such a blowout preventer the locking member apparatus has one, two (preferably opposed), or a plurality of spaced-apart members adjacent and/or encircling the locking shaft portion when the ram apparatus is in an initial open-ram position.

In certain aspects, such a blowout preventer has a locking piston movably disposed around the locking shaft portion, the locking piston having a locking piston end with a locking piston end surface, the locking member apparatus having a secondary surface, the locking piston movable so that the locking piston end surface contacts the secondary surface of the locking member apparatus to maintain the locking member apparatus in a desired position (e.g. in a closed-ram locked position) and/or the secondary surface of the locking member apparatus can have a secondary tapered surface with a secondary taper, the locking piston end surface can have an end tapered surface with an end taper corresponding to the secondary taper, and the locking piston end is movable so that the end tapered surface abuts the secondary tapered surface with the ram apparatus in a closed-ram position.

In certain aspects in such a blowout preventer the locking member apparatus (member, members, wedge, wedges, piece, pieces, etc.) is made of hardened metal and the end taper is at a self-locking angle and the secondary taper is at a self-locking angle so that the locking system is self-locking; and in certain aspects the taper surface(s) of the locking member apparatus and of corresponding tapered surface(s) of a locking piston are also at such an angle that self-locking is effected.

In one aspect a spring apparatus adjacent the locking piston continuously yieldably urges the locking piston against the locking member apparatus.

In one aspect the locking piston has a pressure surface disposed within the main housing for action thereagainst by pressurized fluid for moving the locking piston with respect to the locking member apparatus; and, in one aspect the movement apparatus includes a main closing piston connected to the movable shaft apparatus, the main closing piston disposed within the main housing for action thereagainst by primary pressurized fluid to selectively move the movable shaft apparatus between the positions; and, in certain aspects, the locking piston pressure surface is disposed for action thereagainst by the primary pressurized fluid simultaneously with the application of such fluid to the main closing piston or by a secondary pressurized fluid applied separately and apart from the primary pressurized fluid used for moving the main closing piston.

In certain aspects the main housing has a first end with a first channel therethrough, the locking shaft portion movable in the first channel, the first end having a first end opening through the main housing, an end cover releasably secured over the first end opening, and the end cover is removable to permit access to the locking shaft portion. In certain aspects, a multi-part housing encloses, among other things, the locking member apparatus and disconnecting one part of the housing from another permits access to the locking member apparatus.

It is, therefore, an object of at least certain preferred embodiments of the present invention to provide new, useful, unique, efficient, nonobvious blowout preventers, selective locking mechanisms for them, and methods of their use.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later disguise it by variations in form, changes, or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1B-2 is a crosssection view of the blowout preventer according to the present invention.

FIG. 3 is a perspective view of a locking plate of the blowout preventer of FIG. 1A.

FIG. 4 is a perspective view of a ram shaft of the blowout preventer of FIG. 1A.

DESCRIPTION OF EMBODIMENTS PREFERRED AT THE TIME OF FILING FOR THIS PATENT

Figure 1A:
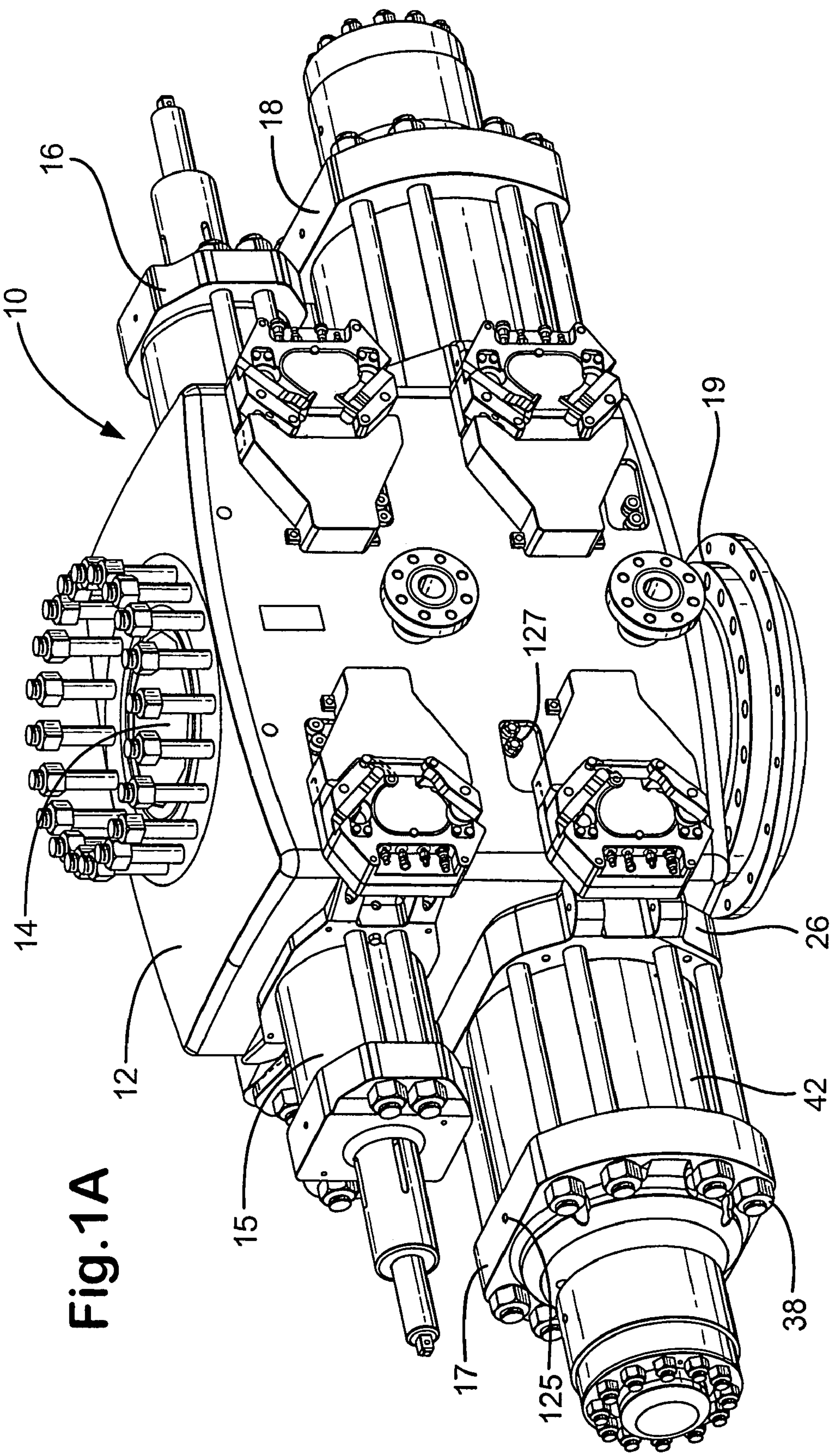
FIG. 1A is a perspective view of a blowout preventer according to the present invention.

FIG. 1A illustrates a blowout preventer 10 according to the present invention which has a main body 12 with a bore 14 therethrough; operators 15–18 for moving ram shafts and rams; and a lower flange 19. As discussed in detail below, the operators selectively move ram apparatuses from open to closed positions.

An operator 20 according to the present invention as shown in FIGS. 1B–1H may be used for any of the operators 15–18.

The operator 20 is enclosed in a cylinder head 22 releasably connected to (e.g. with bolts 20*a*) a cylinder housing 24. The cylinder housing 24 is connected to a door 26 of the blowout preventer 10. An open end 32 of a channel 34 is selectively closed off by an end cover 36 removably held in position by bolts 38 on rods 42.

A locking shaft 40 has a portion 48 extending through and movable within the channel 34. An end 44 of the locking shaft 40 has a channel 46 which receives and holds an end 52 of a ram shaft 50. A portion of the ram shaft 50 extends through an opening 28 in the door 26. A ram apparatus 54 with a ram (shown schematically, e.g. including a ram block, seals, etc.) is secured to an end 56 of the ram shaft 50. Packing 58 surrounds the ram shaft 50.

Figures 1, 1B:
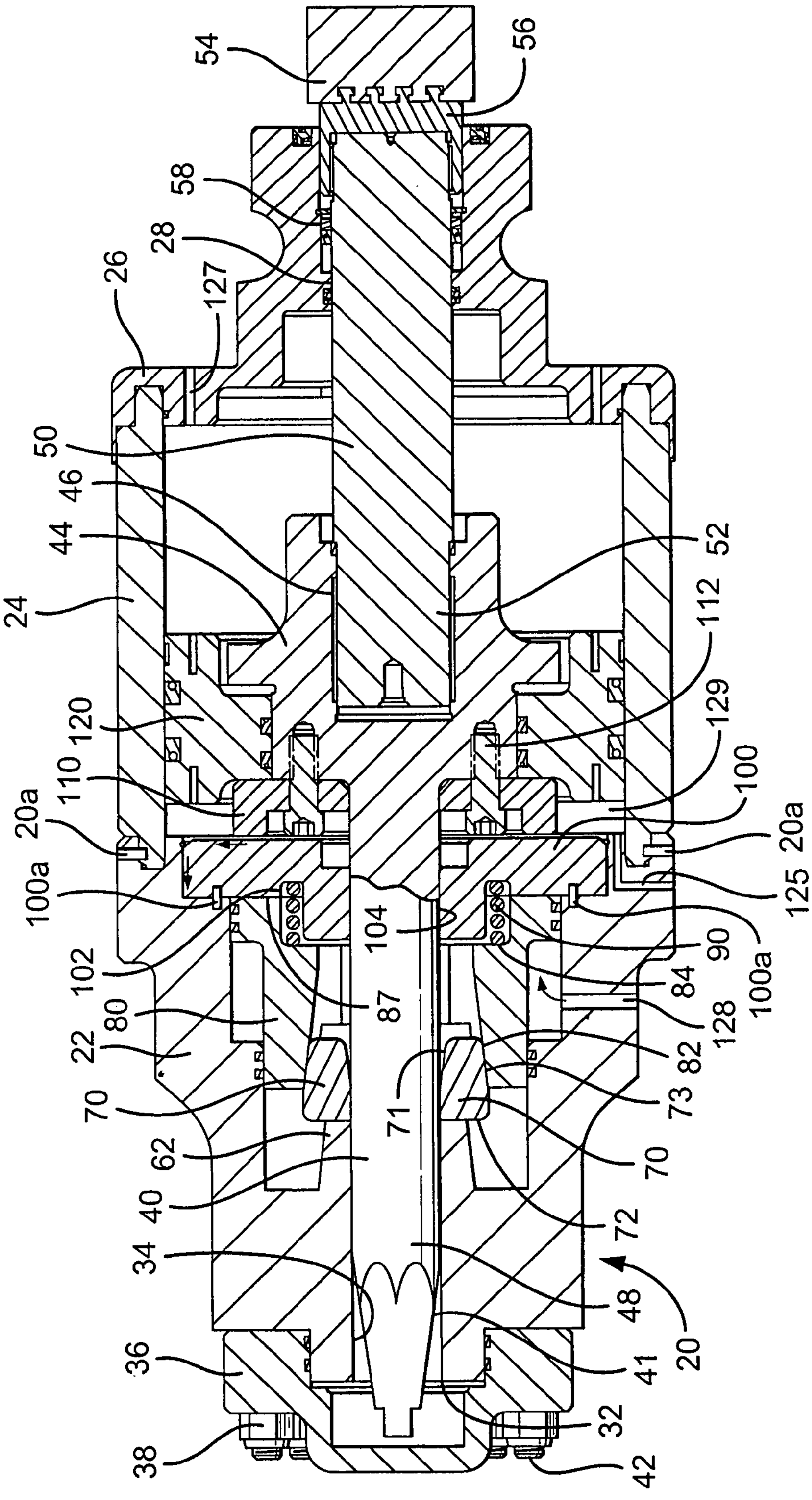
FIG. 1B-1 is a crosssection view of the blowout preventer of FIG. 1A.
Figures 1, 1B, 2:
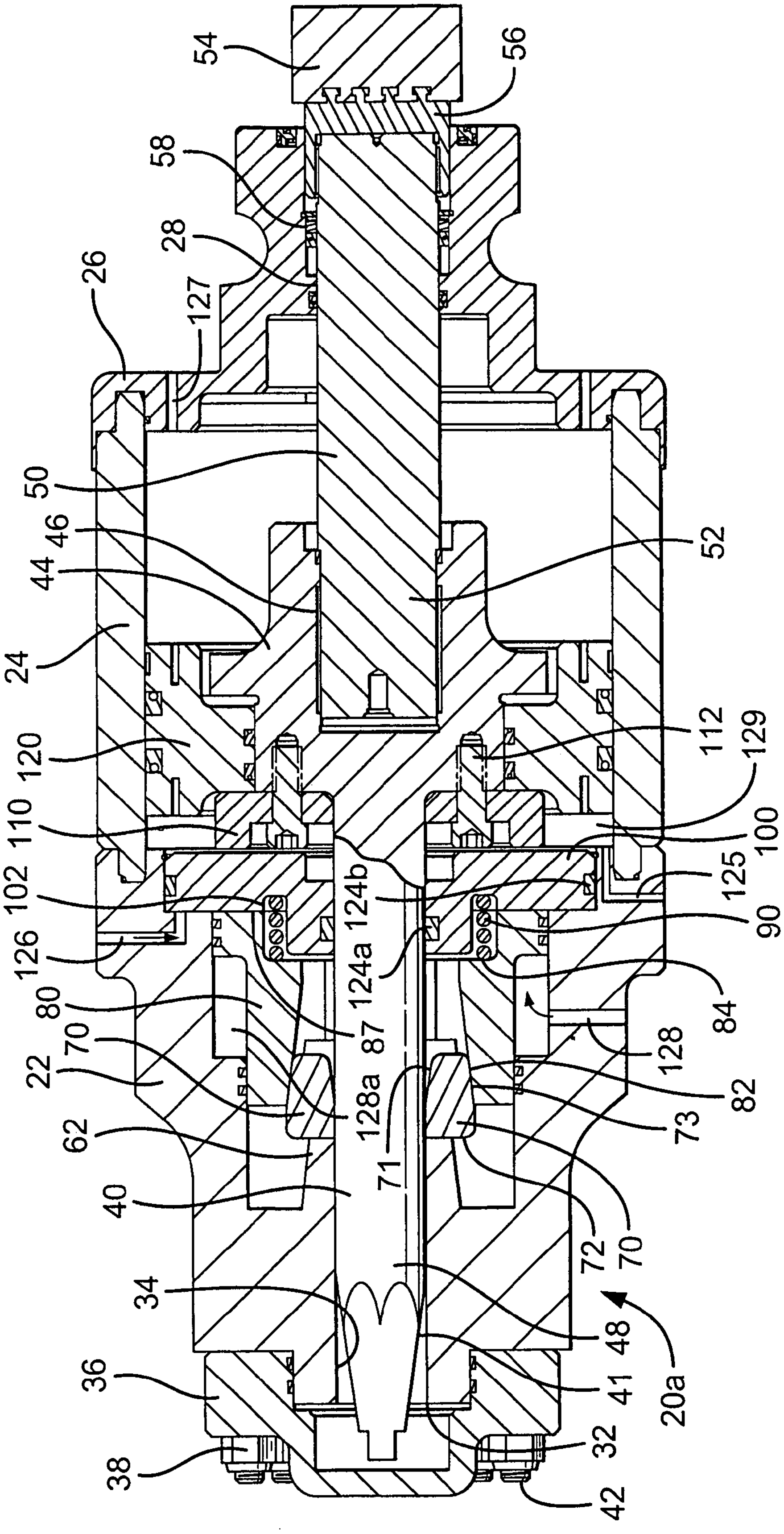
Figure 2A:
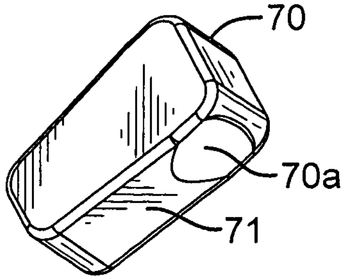
FIG. 2A is a side view of a locking wedge according to the present invention.
Figure 2B:
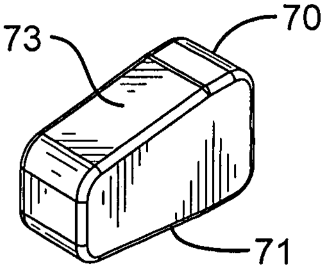
FIG. 2B is a top view of the locking wedge of FIG. 2A.
Figure 2C:
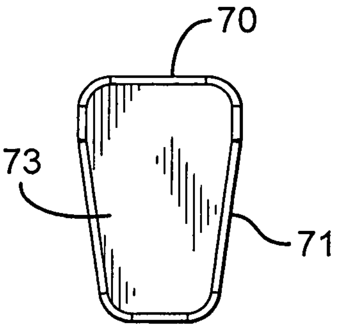
FIG. 2C is a bottom view of the locking wedge of FIG. 2A.
Figure 2D:
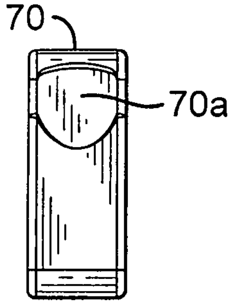
FIG. 2D is a side view of the locking wedge of FIG. 2A opposite the side shown in FIG. 2A.
Figure 2E:
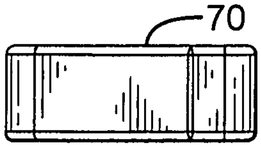
FIG. 2E is a front view of the locking wedge of FIG. 2A.
Figure 2F:
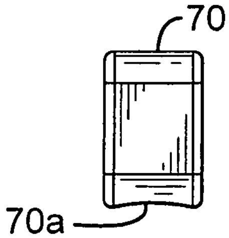
FIG. 2F is a rear view of the locking wedge of FIG. 2A.
Figure 3:
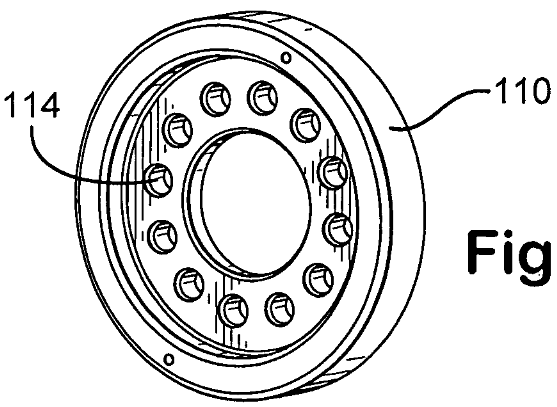
FIGS. 3 and 4 are views of parts of the blowout preventer of FIG. 1A.
Figure 4:
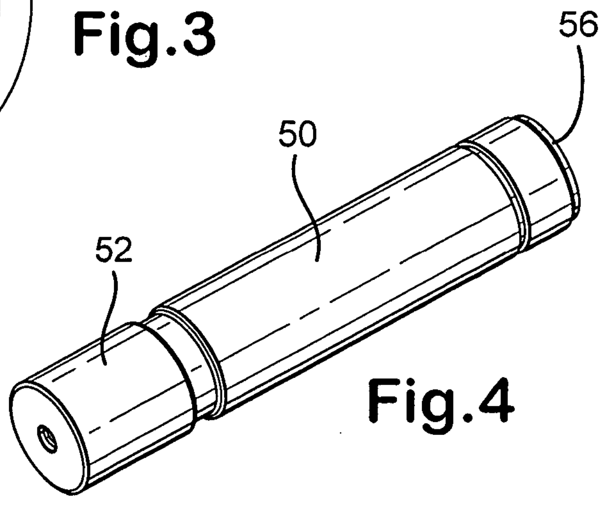

The cylinder head 22 has a locking member ring 62 around the locking shaft 40 and abutted against which are ends 72 of a plurality of locking wedges 70 (six wedges used in the embodiment of FIG. 1B-1). Sides 71 of the wedges 70 (see FIGS. 2A–2G) abut a portion of the locking shaft 40 and sides 73 of the wedges 70 abut a surface 82 of a locking piston 80. Optionally the wedges 70 may have a recessed portion 70*a* (curved as viewed in FIG. 2F with a curve to match and corresponding to the circular crosssection of the locking shaft 40) initially adjacent to the circular part of the locking shaft 40 and for contacting and moving along this part of the locking shaft 40.

A spring 90 (optional) abuts a surface 84 of the locking piston 80. Part of the spring 90 is held in a recess 102 of a spring housing 100 which is bolted with bolts 100*a* to the cylinder head 22. The locking shaft 40 is movable through an opening 104 of the spring housing 100. The spring 90 continuously urges the locking piston 80 toward and against the wedges 70. In one aspect the spring 90 has sufficient force to overcome the weight of the wedges 70 and the weight of the locking piston 80.

A locking plate 110, secured to the locking shaft 40 with bolts 112 passing through holes 114, secures a main piston 120 in position around the locking shaft 40. Fluid under pressure to move the main piston (and the locking shaft, ram shaft, and locking plate) to close the rams is selectively introduced on one side of the main piston through a fluid inlet 125. Fluid under pressure to move the main piston in the opposite direction is selectively introduced through an inlet 127.

As shown in FIG. 1B, fluid flowing into a space 129 on one side of the main piston 120 can flow around the outer edge of the spring housing 100 (since this flow path is not sealed) to push against a surface 87 of the locking piston 80 (as shown by the arrows in FIG. 1B-1). Thus fluid under pressure introduced into the space 129 simultaneously urges the main piston 120 in one direction and urges the locking piston in the opposite direction, so that, upon co-action of tapered surfaces of the wedges with tapered surfaces on the locking piston, automatic locking of the locking shaft is effected.

As shown in FIG. 1B-1, the surfaces 73 of each wedge 70 have a self-locking taper angle and the surface 82 of the locking piston 80 also has a self-locking taper angle. Additionally, the surfaces of the sides 71 of the wedges 70 have a self-locking taper angle. The wedges 70 may be made of any suitable hard material; e.g., but not limited to, hardened steel [e.g. SPINODAL (Trademark) Copper material—a steel/copper alloy] with a coefficient of friction between 0.1 to 0.2 (and thus with taper angles between 0° and 11°); for the embodiment shown in FIG. 1B-1, the taper angle for the surfaces of the sides 71 and 73 is 7° and the taper angle for the surface 82 is 7°. By urging the locking piston 80 against the wedges 70, the wedges 70 are prevented from moving away from the locking shaft 40.

FIG. 1B-1 shows the blowout preventer 10 in a rams-open position. FIG. 1C shows the locking shaft 40 after it has started to move (following initiation of closing of the rams of the blowout preventer). Part of the surface 71 of the wedges 70 have moved to contact part of a corresponding tapered surface 41 of the locking shaft 40. The spring 90 and pressure against the surface 87 of the locking piston 80 move the locking piston 80 toward the end cover 36, forcing the wedges 70 against the tapered surfaces 41 of the locking shaft 40.

Figure 1C:
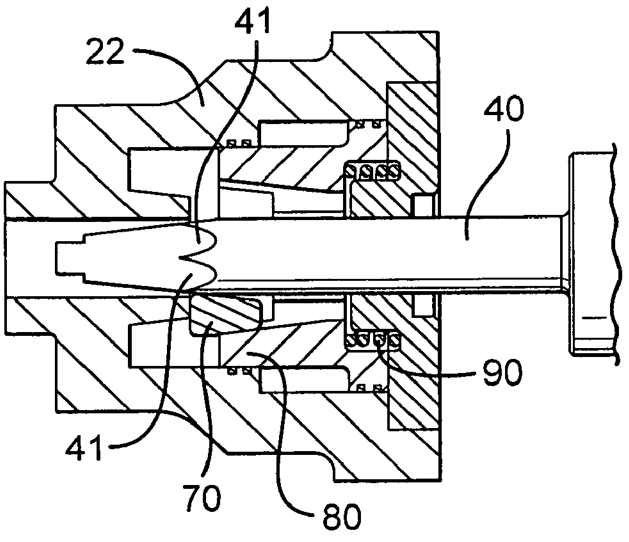
FIG. 1C is a partial crosssection view of the blowout preventer of FIG. 1A.
Figure 1D:
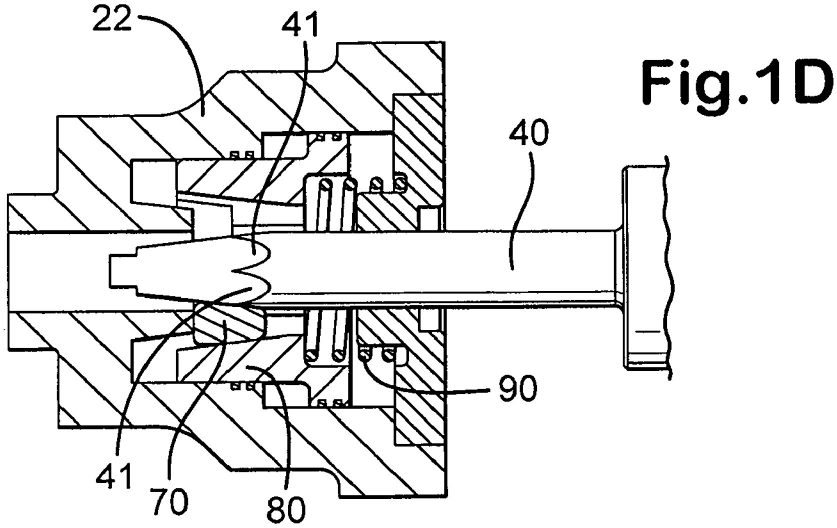
FIG. 1D is a partial crosssection view of the blowout preventer of FIG. 1A.

As shown in FIG. 1D the locking piston 80 has moved the wedges 70 inwardly so that the surfaces 71 of the sides of the wedges 70 are in contact with the tapered surfaces 41 of the locking shaft 40 and the locking shaft 40 (and the ram shaft 50 and the ram apparatus 54) are releasably locked in place (e.g. in a rams-closed configuration). Due to the self-locking tapers on the surfaces of the wedges 70 and on the locking piston 80, if the spring 90 is removed or fails and/or if pressure is no longer applied to the locking piston 80, the locking shaft 40 will remain locked. Via a port 128 fluid under pressure is selectively introduced into a space 128*a* to move the locking piston 40 back towards its initial position permitting unlocking of the locking shaft 40.

Figure 1E:
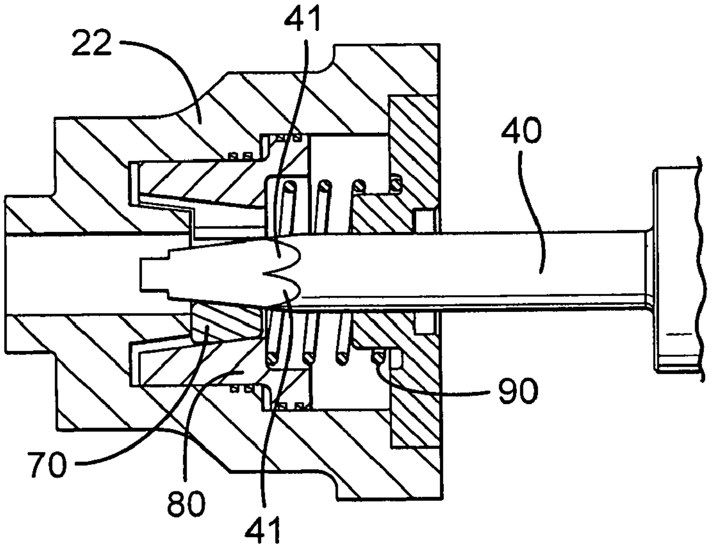
FIG. 1E is a partial crosssection view of the blowout preventer of FIG. 1A.

FIG. 1E illustrates that the locking shaft 40 (and hence the ram shaft 50 and items connected to it) can travel an additional distance while the locking piston 80 travels farther and continues to urge the wedges 70 against a tapered part of the locking shaft 40 (e.g. to accommodate different size tubulars and/or to accommodate ram seal wear). For example, with two inches additional travel distance of the locking shaft, as shown in FIG. 1E as compared to FIG. 1D, the blowout preventer can accommodate drill pipe between 2⅞" and 7⅝" in diameter. In both the positions shown in FIGS. 1D and 1E the locking shaft is locked in place. The wedges 70, locking piston 80, and tapers on the locking shaft 40 are sized, positioned, and configured to permit the additional length for locking of the locking shaft 40.

Figure 1F:
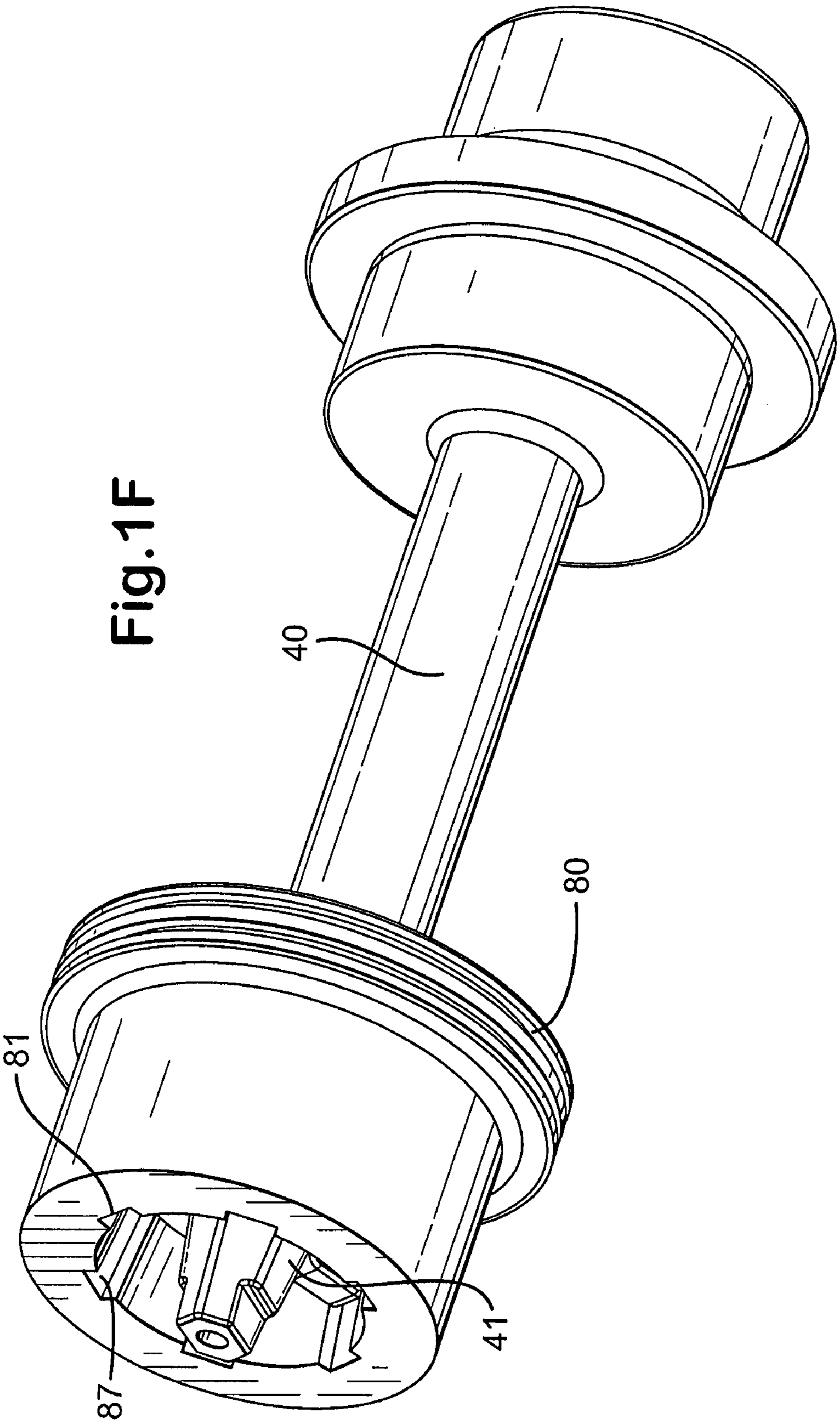
FIG. 1F is a perspective view of part of the blowout preventer of FIG. 1A.
Figure 1G:
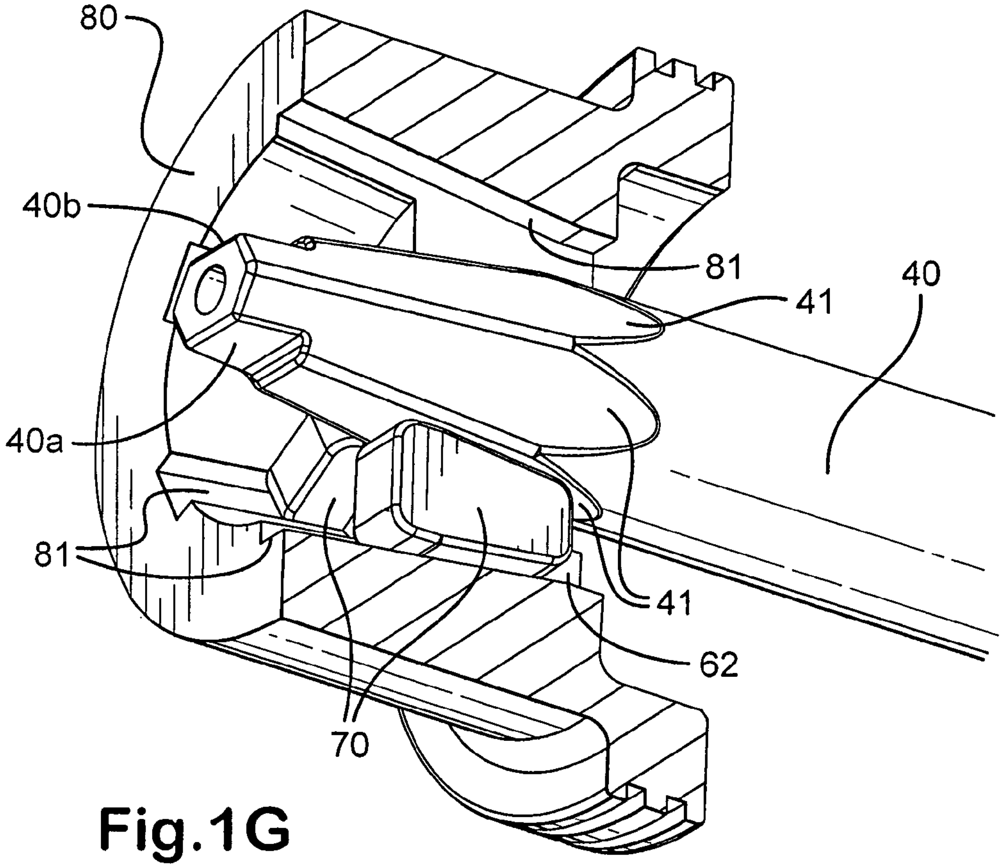
FIG. 1G is a perspective view of part of the blowout preventer of FIG. 1A.

As shown in FIGS. 1F and 1G, the locking piston 80 has a recess 81 corresponding to each of the wedges 70 and the surfaces 82 are part of these recesses 81.

Figure 1H:
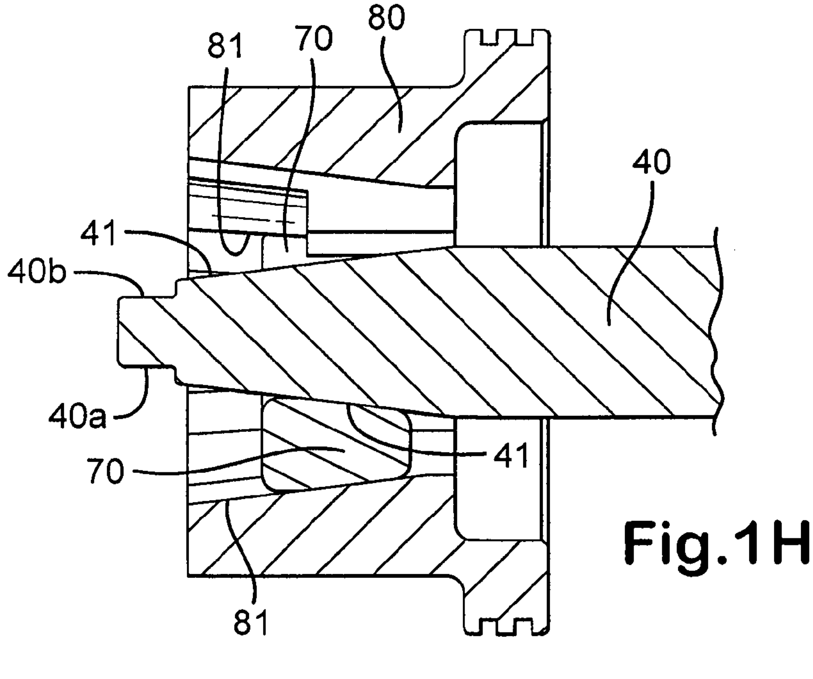
FIG. 1H is a partial crosssection view of the blowout preventer of FIG. 1A.

FIG. 1H illustrates the positions of the wedges 70, locking piston 80 and locking shaft 40 in a rams-closed, shaft-locked position. As shown, e.g., in FIGS. 1G and H, the locking shaft 40 has an end with wrench flats 40*a*, 40*b* usable to assist in disconnection of the locking shaft 40 from the ram shaft 50 (which are releasably connected by threads 40*t*, 50*t*).

As shown in FIG. 1B-2 an independent non-automatic locking function according to the present invention can be provided with the blowout preventer 20*a* (like the blowout preventer 20; like numerals indicate like parts) (or with any blowout preventer) by sealing off the interface between the cylinder head 22 and the spring housing 104 (e.g. with a seal 124*b*) and sealing off the interface between the locking shaft 40 and the spring housing 100 (e.g. with a seal 124*a*) thus blocking off the fluid flow path indicated by the arrows in FIG. 1B-1 which permitted fluid to be applied against the locking piston 80. Fluid under pressure to move the locking piston 80 is selectively applicable through a port 126 through the cylinder head 22 which flows as indicated by the arrow near the port 126 in FIG. 1B-2. Thus, according to the present invention, a locking mechanism according to the present invention may be used with automatically locking blowout preventers and with blowout preventers that do not automatically lock. In the blowout preventer 20*a* locking of the locking shaft 40 does not occur until fluid is introduced through the port 126 (e.g. in one aspect when a driller pushes a "LOCK" button on a control console which activates a control system to cause such fluid flow).

The present invention, therefore, it at least certain embodiments, provides a blowout preventer with: a main body; a ram system with ram apparatus movably disposed within the main body; a movement system with movable shaft apparatus connected to the ram apparatus for moving the ram apparatus from a first position in which the ram apparatus is open to a second position in which the ram apparatus is closed; the movable shaft apparatus including a locking shaft portion, the locking shaft portion having a locking shaft tapered portion; a locking system for selectively locking the ram apparatus in the closed position; the locking system having locking member apparatus having a primary tapered surface; the primary tapered surface in contact with the locking shaft portion of the movable shaft apparatus; and the locking shaft portion movable with the movable shaft apparatus so that the primary tapered surface of the locking member apparatus contacts the locking shaft tapered portion to releasably lock the movable shaft apparatus. Such a blowout preventer may have one or some—in any possible combination—of the following: the locking shaft tapered portion of sufficient length that the blowout preventer can accommodate tubulars in a range of different sizes; wherein the tubular is drill pipe and the blowout preventer can accommodate drill pipe of different outer diameters, e.g., in one particular aspect, between 2⅞ inches and 7⅝ inches in diameter; wherein the ram system includes ram seal apparatus and in the blowout preventer the locking shaft tapered portion is of sufficient length that the blowout preventer can accommodate worn ram seal apparatus; wherein the locking member apparatus is a plurality of spaced-apart members around the locking shaft portion when the ram apparatus is in the first position; wherein the blowout preventer has ram apparatus is from the group of shear rams, variable bore rams, and pipe rams; a locking piston movably disposed around the locking shaft portion, the locking piston having a locking piston end with a locking piston end surface, the locking member apparatus having a secondary surface, and the locking piston movable by fluid under pressure so that the locking piston end surface contacts the secondary surface of the locking member apparatus to maintain the locking member apparatus in a desired position and/or in a locked position; wherein the secondary surface of the locking member apparatus has a secondary tapered surface with a secondary taper, the locking piston end surface has an end tapered surface with an end taper corresponding to the secondary taper, and the locking piston end movable so that the end tapered surface abuts the secondary tapered surface with the ram apparatus in the second position; wherein the end taper is at a self-locking angle and the secondary taper is at a self-locking angle so that the locking system is self-locking; wherein the locking shaft portion has a part with a circular cross-section and the locking member apparatus has a curved portion corresponding to, initially adjacent, and in contact with said part of the locking shaft portion; spring apparatus adjacent the locking piston for continuously yieldably urging the locking piston against the locking member apparatus; the locking piston having a pressure surface disposed within the main housing for action thereagainst by pressurized fluid for moving the locking piston with respect to the locking member apparatus; the movement apparatus including a main closing piston connected to the movable shaft apparatus, the main closing piston disposed within the main housing for action thereagainst by primary pressurized fluid to selectively move the movable shaft apparatus between the first position and the second position; the movement apparatus including a main closing piston connected to the movable shaft apparatus, the main closing piston disposed within the main housing for action thereagainst by primary pressurized fluid applied in a first space to selectively move the movable shaft apparatus between the first position and the second position, and the locking piston pressure surface disposed for action thereagainst by primary pressurized fluid flowing from the first space to contact the locking piston pressure surface so that the ram apparatus is automatically locked in the closed position when the movement system moves the ram apparatus to the closed position; the main housing having a first end with a first channel therethrough, the locking shaft portion movable in the first channel, the first end having a first end opening through the main housing, an end cover releasably secured over the first end opening, and the end cover removable to permit access to the locking shaft portion; the first channel is of sufficient length and the locking shaft portion is of sufficient length that the locking shaft is movable out of the first channel to permit access within the blowout preventer; wherein the movement system includes a movement member on the movable shaft apparatus, the movable member movable in response to fluid under pressure introduced within the main body on a first side of the movable member to move the movable shaft to the first position and the fluid under pressure introduced on a second side of the movable member to move the movable shaft to the second position; the movement apparatus including a main closing piston connected to the movable shaft apparatus, the main closing piston disposed within the main housing for action thereagainst by primary pressurized fluid applied in a first space to selectively move the movable shaft apparatus from the first position to the second position, and the locking piston pressure surface disposed for action thereagainst by secondary pressurized fluid, the secondary pressurized fluid separate and apart from the primary pressurized fluid; and/or unlocking apparatus for selectively unlocking the ram apparatus from the closed position.

The present invention, therefore, it at least certain embodiments, provides a blowout preventer with a main body, a ram system with ram apparatus movably disposed within the main body, the ram apparatus from the group of shear rams, variable bore rams, and pipe rams, a movement system with movable shaft apparatus connected to the ram apparatus for moving the ram apparatus from a first position in which the ram apparatus is open to a second position in which the ram apparatus is closed, the movable shaft apparatus including a locking shaft portion, the locking shaft portion having a tapered portion, a locking system for selectively locking the ram apparatus in the closed position, the locking system having locking member apparatus having a primary tapered surface, the primary tapered surface in contact with the locking shaft portion of the movable shaft apparatus, the locking shaft portion movable with the movable shaft apparatus so that the primary tapered surface of the locking member apparatus contacts the tapered portion of the locking shaft portion to releasably lock the movable shaft apparatus, wherein the locking member apparatus is a plurality of spaced-apart members around the locking shaft portion when the ram apparatus is in the first position, a locking piston movably disposed around the locking shaft portion, the locking piston having a locking piston end with a locking piston end surface, the locking member apparatus having a secondary surface, the locking piston movable by fluid under pressure so that the locking piston end surface contacts the secondary surface of the locking member apparatus to maintain the locking member apparatus in a desired position, the locking piston having a pressure surface disposed within the main housing for action thereagainst by pressurized fluid for moving the locking piston with respect to the locking member apparatus, the movement apparatus including a main closing piston connected to the movable shaft apparatus, the main closing piston disposed within the main housing for action thereagainst by primary pressurized fluid to selectively move the movable shaft apparatus between the first position and the second position, and unlocking apparatus for selectively unlocking the ram apparatus from the closed position.

The present invention, therefore, it at least certain embodiments, provides a locking system for a blowout preventer having a main body with a ram system with ram apparatus movably disposed within the main body and a movement system with movable shaft apparatus connected to the ram apparatus for moving the ram apparatus from a first position in which the ram apparatus is open to a second position in which the ram apparatus is closed, the movable shaft apparatus including a locking shaft portion, the locking shaft portion having a tapered portion, the locking system for selectively locking the ram apparatus in the closed position; the locking system having locking member apparatus having a primary tapered surface, the primary tapered surface in contact with the locking shaft portion of the movable shaft apparatus, and the locking shaft portion movable with the movable shaft apparatus so that the primary tapered surface of the locking member apparatus contacts the tapered portion of the locking shaft portion to releasably lock the movable shaft apparatus. Such a locking system may have either or both of the following: wherein the blowout preventer further includes a locking piston movably disposed around the locking shaft portion, the locking piston having a locking piston end with a locking piston end surface, the locking system further including the locking member apparatus having a secondary surface, and the locking piston movable by fluid under pressure so that the locking piston end surface contacts the secondary surface of the locking member apparatus to maintain the locking member apparatus in a desired position; and/or wherein the locking shaft portion has a part with a circular cross-section and the locking member apparatus has a curved portion corresponding to, initially adjacent, and in contact with said part of the locking shaft portion In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes.

What is claimed is:

1. A blowout preventer comprising a main body, a ram system with ram apparatus movably disposed within the main body, a movement system with movable shaft apparatus connected to the ram apparatus for moving the ram apparatus from a first position in which the ram apparatus is open to a second position in which the ram apparatus is closed, the movable shaft apparatus including a locking shaft portion, the locking shaft portion having a locking shaft tapered portion, a locking system for selectively locking the ram apparatus in the closed position, the locking system comprising locking member apparatus having a primary tapered surface, the primary tapered surface in contact with the locking shaft portion of the movable shaft apparatus, the locking shaft portion movable with the movable shaft apparatus so that the primary tapered surface of the locking member apparatus contacts the locking shaft tapered portion to releasably lock the movable shaft apparatus, the main body having a first end with a first channel therethrough, the locking shaft portion movable in the first channel, the first end having a first end opening through the main body, an end cover releasably secured over the first end opening, and the end cover removable to permit access to the locking shaft portion.

2. The blowout preventer of claim 1 wherein the first channel is of sufficient length and the locking shaft portion is of sufficient length that the locking shaft is movable out of the first channel to permit access to the locking member apparatus.

3. The blowout preventer of claim 1 further comprising the locking shaft tapered portion of sufficient length that the blowout preventer can accommodate tubulars in a range of different sizes.

4. The blowout preventer of claim 3 wherein the tubular is drill pipe and the blowout preventer can accommodate drill pipe between 2⅞ inches and 7⅝ inches in diameter.

5. The blowout preventer of claim 1 wherein the ram system includes ram seal apparatus and the blowout preventer further comprising the locking shaft tapered portion of sufficient length that the blowout preventer can accommodate worn ram seal apparatus.

6. The blowout preventer of claim 1 wherein the locking member apparatus comprises a plurality of spaced-apart members around the locking shaft portion when the ram apparatus is in the first position.

7. The blowout preventer of claim 1 wherein the blowout preventer has ram apparatus from the group consisting of shear rams, variable bore rams, and pipe rams.

8. The blowout preventer of claim 1 further comprising a locking piston movably disposed around the locking shaft portion, the locking piston having a locking piston end with a locking piston end surface, the locking member apparatus having a secondary surface, and the locking piston movable by fluid under pressure so that the locking piston end surface contacts the secondary surface of the locking member apparatus to maintain the locking member apparatus in a desired position.

9. The blowout preventer of claim 8 wherein the secondary surface of the locking member apparatus has a secondary tapered surface with a secondary taper, the locking piston end surface has an end tapered surface with an end taper corresponding to the secondary taper, and the locking piston end movable so that the end tapered surface abuts the secondary tapered surface with the ram apparatus in the second position.

10. The blowout preventer of claim 9 wherein the end taper is at a self-locking angle and the secondary taper is at a self-locking angle so that the locking system is self-locking.

11. The blowout preventer of claim 9 wherein the locking shaft portion has a part with a circular cross-section and the locking member apparatus has a curved portion corresponding to, initially adjacent, and in contact with said part of the locking shaft portion.

12. The blowout preventer of claim 8 further comprising spring apparatus adjacent the locking piston for continuously yieldably urging the locking piston against the locking member apparatus.

13. The blowout preventer of claim 8 further comprising the locking piston having a pressure surface disposed within the main housing for action thereagainst by pressurized fluid for moving the locking piston with respect to the locking member apparatus.

14. The blowout preventer of claim 13 further comprising the movement apparatus including a main closing piston connected to the movable shaft apparatus, the main closing piston disposed within the main housing for action thereagainst by primary pressurized fluid applied in a first space to selectively move the movable shaft apparatus between the first position and the second position, and the locking piston pressure surface disposed for action thereagainst by primary pressurized fluid flowing from the first space to contact the locking piston pressure surface so that the ram apparatus is automatically locked in the closed position when the movement system moves the ram apparatus to the closed position.

15. The blowout preventer of claim 13 further comprising the movement system including a main closing piston connected to the movable shaft apparatus, the main closing piston disposed within the main housing for action thereagainst by primary pressurized fluid applied in a first space to selectively move the movable shaft apparatus from the first position to the second position, and the locking piston pressure surface disposed for action thereagainst by secondary pressurized fluid, the secondary pressurized fluid separate and apart from the primary pressurized fluid.

16. The blowout preventer of claim 1 further comprising the movement apparatus including a main closing piston connected to the movable shaft apparatus, the main closing piston disposed within the main body for action thereagainst by primary pressurized fluid to selectively move the movable shaft apparatus between the first position and the second position.

17. The blowout preventer of claim 1 wherein the movement system includes a movement member on the movable shaft apparatus, the movement member movable in response to fluid under pressure introduced within the main body on a first side of the movement member to move the movable shaft to the first position and the fluid under pressure introduced on a second side of the movement member to move the movable shaft to the second position.

18. The blowout preventer of claim 1 further comprising unlocking apparatus for selectively unlocking the ram apparatus from the closed position.

19. A blowout preventer comprising a main body, a ram system with ram apparatus movably disposed within the main body, the ram apparatus from the group consisting of shear rams, variable bore rams, and pipe rams, a movement system with movable shaft apparatus connected to the ram apparatus for moving the ram apparatus from a first position in which the ram apparatus is open to a second position in which the ram apparatus is closed, the movable shaft apparatus including a locking shaft portion, the locking shaft portion having a tapered portion, a locking system for selectively locking the ram apparatus in the closed position, the locking system comprising locking member apparatus having a primary tapered surface, the primary tapered surface in contact with the locking shaft portion of the movable shaft apparatus, the locking shaft portion movable with the movable shaft apparatus so that the primary tapered surface of the locking member apparatus contacts the tapered portion of the locking shaft portion to releasably lock the movable shaft apparatus, wherein the locking member apparatus comprises a plurality of spaced-apart members around the locking shaft portion when the ram apparatus is in the first position, a locking piston movably disposed around the locking shaft portion, the locking piston having a locking piston end with a locking piston end surface, the locking member apparatus having a secondary surface, the locking piston movable by fluid under pressure so that the locking piston end surface contacts the secondary surface of the locking member apparatus to maintain the locking member apparatus in a desired position, the locking piston having a pressure surface disposed within the main body for action thereagainst by pressurized fluid for moving the locking piston with respect to the locking member apparatus, the movement system including a main closing piston connected to the movable shaft apparatus, the main closing piston disposed within the main body for action thereagainst by primary pressurized fluid to selectively move the movable shaft apparatus between the first position and the second position, unlocking apparatus for selectively unlocking the ram apparatus from the closed position, the main body having a first end with a first channel therethrough, the locking shaft portion movable in the first channel, the first end having a first end opening through the main body, an end cover releasably secured over the first end opening, and the end cover removable to permit access to the locking shaft portion.

* * * * *